US010105800B2

(12) United States Patent
Ruh et al.

(10) Patent No.: US 10,105,800 B2
(45) Date of Patent: Oct. 23, 2018

(54) APPARATUS AND METHOD FOR MANUFACTURING COIL SCREENS

(71) Applicant: KARL MAYER TEXTILMASCHINENFABRIK GMBH, Obertshausen (DE)

(72) Inventors: Michael Ruh, Muehlheim/Main (DE); Michael-Heinz Funk, Hainburg (DE); Simon Schratz, Frankfurt am Main (DE)

(73) Assignee: KARL MAYER TEXTILMASCHINENFABRIK GMBH, Obertshausen (DE)

( * ) Notice: Subject to any disclaimer, the term of this patent is extended or adjusted under 35 U.S.C. 154(b) by 410 days.

(21) Appl. No.: 14/832,374

(22) Filed: Aug. 21, 2015

(65) Prior Publication Data
US 2016/0121440 A1    May 5, 2016

(30) Foreign Application Priority Data

Nov. 4, 2014    (EP) .................................... 14191675

(51) Int. Cl.
B21F 27/12        (2006.01)
B23P 15/16        (2006.01)
(Continued)

(52) U.S. Cl.
CPC .............. B23P 15/16 (2013.01); B21F 27/12 (2013.01); D21F 1/0072 (2013.01); B21F 3/12 (2013.01)

(58) Field of Classification Search
CPC .. B21F 3/12; B21F 27/00; B21F 27/02; B21F 27/12; B21F 27/128; B21F 27/18;
(Continued)

(56) References Cited

U.S. PATENT DOCUMENTS 4,459,733 A      7/1984  Bachmann et al.
4,477,959 A  *  10/1984  Burnecke .............. D21F 1/0072
                                                140/3 R
(Continued)

FOREIGN PATENT DOCUMENTS

DE    10 2007 052 594       7/2009
EP         0 041 685       12/1981
(Continued)

OTHER PUBLICATIONS

Korea Office Action conducted in counterpart Korea Appln. No. 10-2015-0130975 (dated Oct. 11, 2016).
(Continued)

Primary Examiner — Edward Tolan
(74) Attorney, Agent, or Firm — Greenblum & Bernstein P.L.C.

(57) ABSTRACT

Apparatus and method for manufacturing coil screens. Apparatus includes a working surface having a first edge and a second edge; a joining device, which is structured and arranged to deposit coils on the working surface, being movable over the working surface in a direction of movement from the first edge to the second edge; and a slider, which is arranged on the working surface at least in a region of the first edge, being movable perpendicularly to the direction of movement of the joining device.

16 Claims, 2 Drawing Sheets

(51) Int. Cl.
*D21F 1/00* (2006.01)
*B21F 3/12* (2006.01)

(58) Field of Classification Search
CPC .... B21F 29/00; B21F 31/00; Y10T 29/49838; B23P 15/16; D21F 1/0072
See application file for complete search history.

(56) References Cited

U.S. PATENT DOCUMENTS

| | | | | |
|---|---|---|---|---|
| 4,535,824 A | * | 8/1985 | Kerber | B21F 27/18 140/111 |
| 4,920,638 A | * | 5/1990 | Metzinger | B21F 27/18 140/3 R |
| 5,068,960 A | * | 12/1991 | Metzinger | B21F 43/00 226/108 |
| 2010/0287775 A1 | | 11/2010 | Bachmann et al. | |

FOREIGN PATENT DOCUMENTS

| | | |
|---|---|---|
| JP | S55-142789 | 11/1980 |
| JP | S56-014641 | 2/1981 |
| JP | S57-051432 | 3/1982 |
| JP | S59-179855 | 10/1984 |
| JP | S61-28096 | 2/1986 |
| JP | S61-186596 | 8/1986 |
| JP | S62-074815 | 4/1987 |
| JP | 2011-504146 | 2/2011 |
| KR | 10-2010-0087198 | 8/2010 |

OTHER PUBLICATIONS

European Search Report/Office Action conducted in counterpart European Appln. No. 14 191 675.9 (dated Apr. 17, 2015).

Japan Search Report/Office Action conducted in counterpart Japan Appln. No. 2015-215947 (dated Aug. 23, 2016).

* cited by examiner

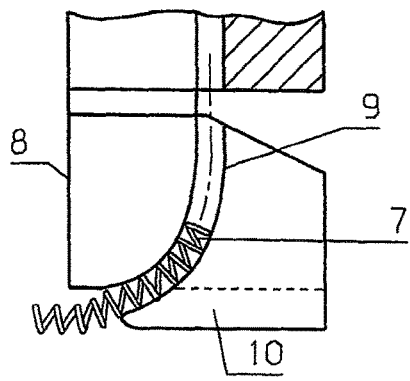
Fig:2
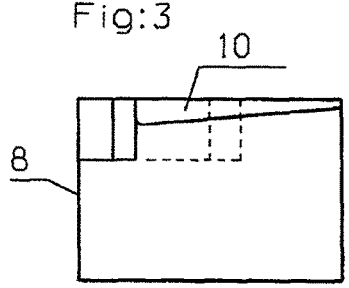
Fig:3
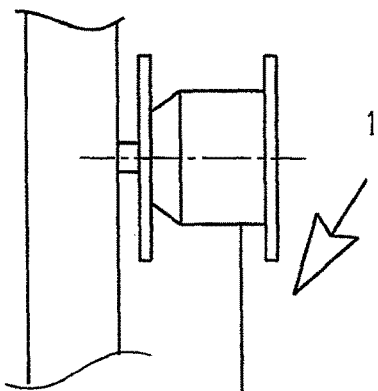
Fig: 1
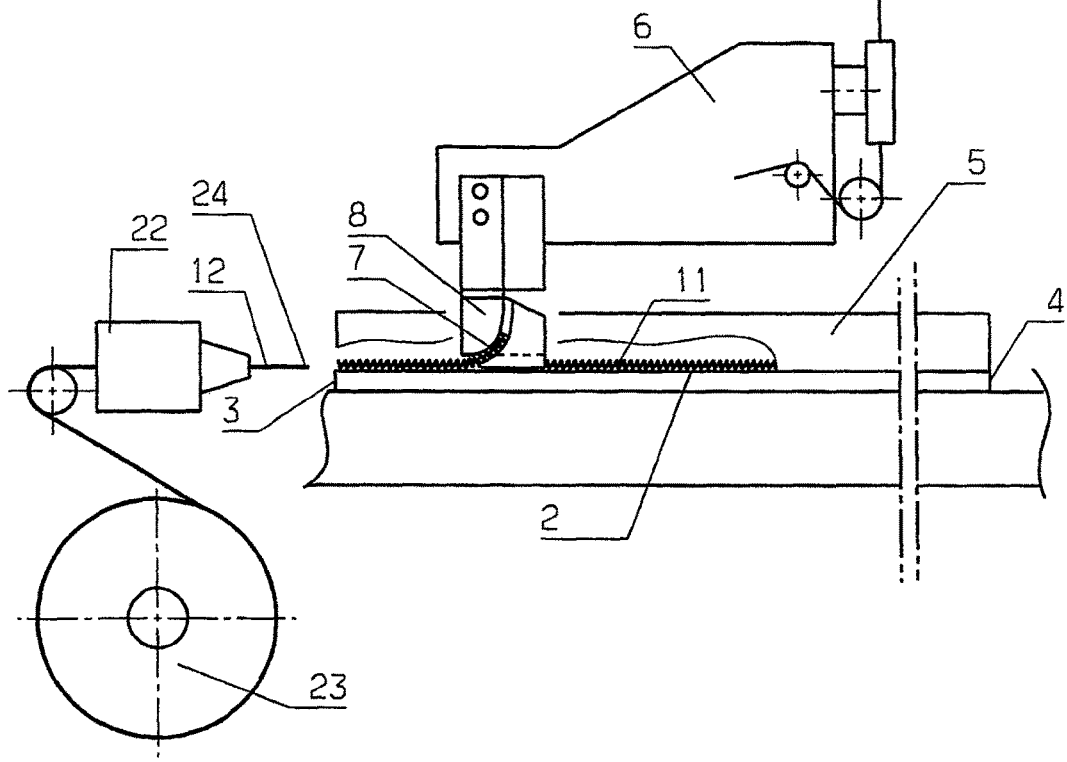

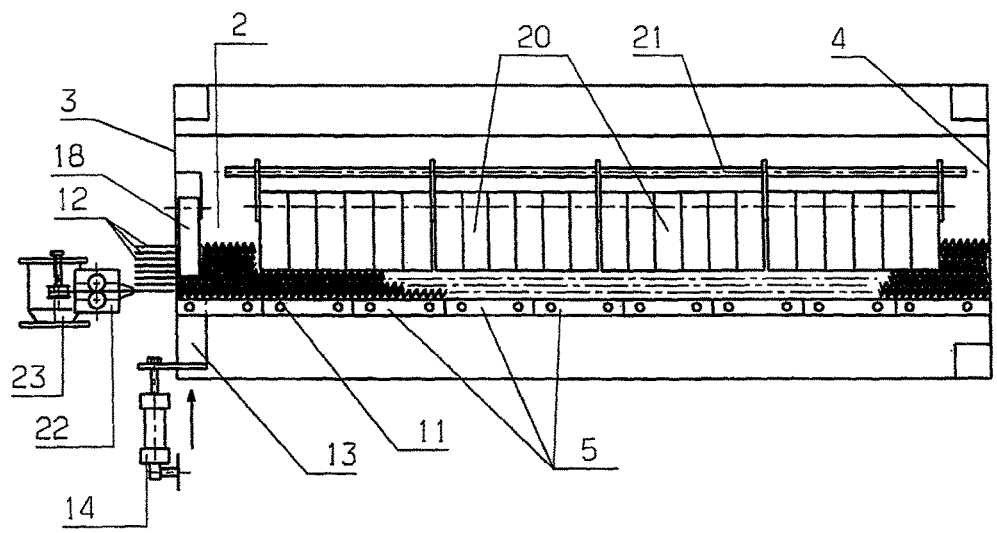
Fig:4
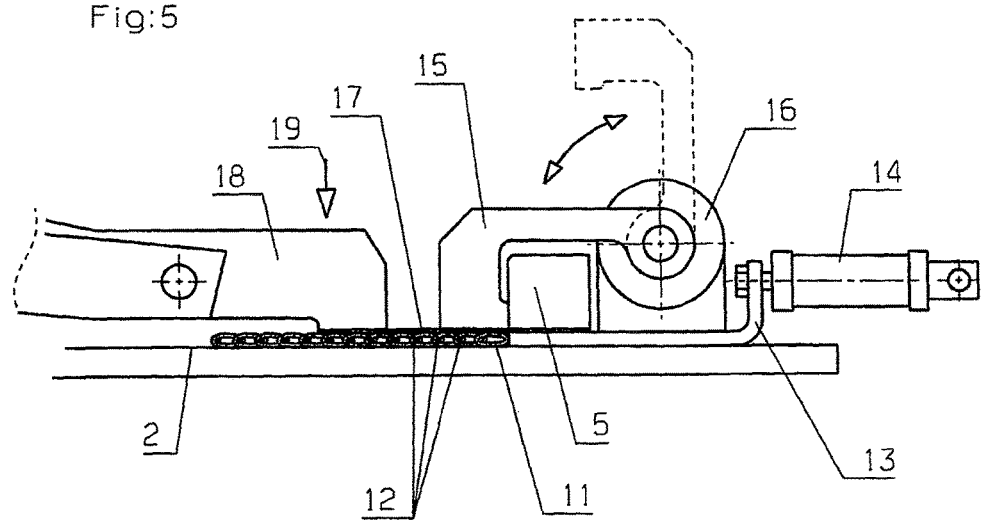
Fig:5

APPARATUS AND METHOD FOR MANUFACTURING COIL SCREENS

CROSS-REFERENCE TO RELATED APPLICATIONS

The present application claims priority under 35 U.S.C. § 119 of European Patent Application No. 14 191 675.9, filed Nov. 4, 2014, the disclosure of which is expressly incorporated by reference herein in its entirety.

BACKGROUND OF THE EMBODIMENTS

1. Field of the Invention

Embodiments of the invention relate to an apparatus for manufacturing coil screens that includes a working surface and a joining device with which coils can be deposited on the working surface and which can be moved over the working surface in a direction of movement from a first edge of the working surface to a second edge of the working surface.

Furthermore, embodiments relate to a method for manufacturing coil screens in which multiple coils are consecutively deposited on the working surface by a joining device that is moved over the working surface in a direction of movement from a first edge of the working surface to a second edge of the working surface and in which coils arranged side by side are brought into engagement with one another by the joining device during the depositing.

2. Discussion of Background Information

An apparatus of this type and method of this type are known, e.g., from DE 10 2007 052 594 B4 (and its family member U.S. Patent Publication No. 2010/0287775), the disclosures of which are expressly incorporated by reference herein in their entireties. In the known art, the coils are produced above the working surface by a winding device, and the winding device is moved over the working surface together with the joining device. The joining device comprises a displacement spur, with which the coils already deposited on the working surface can be displaced far enough laterally that a new coil can be deposited on the working surface and thereby engages with the adjacent, previously deposited coil. A fixing wire can be slid into the overlap region between the adjacent coils in order to connect the coils to one another.

In practice, however, it has become apparent that it is not possible to dependably achieve a process-reliable automation of the manufacturing process using the approach described in the above-noted known art.

SUMMARY OF THE EMBODIMENTS

Embodiments of invention render the manufacture of coil screens process-reliable.

Accordingly, embodiments are directed to an apparatus of the type discussed above that includes, at least in a region of the first edge, a slider arranged on the working surface which can be moved perpendicularly to the direction of movement of the joining device.

Via the slider, the joining device is relieved of the tasks of displacement, at least for the start of the depositing operation of each new coil. With the aid of the slider, the end of the coils already deposited on the working surface can be displaced so that space can be made for the new coil before the joining device deposits a new coil in this position. Because, in embodiments, the joining device has, at least at the start of the depositing, but one function to perform, i.e., depositing the coil on the working surface, an increased process reliability results in this case.

In embodiments, it may be advantageous that the joining device includes a displacement spur and that the slider has a movement stroke equal to at least a width of the displacement spur. With the slider, a clear space can thus be created into which the displacement spur can be inserted without already having to perform a displacement movement during this insertion. The risk of the displacement spur crushing, or otherwise damning or damaging, coils located on the working surface is thus kept low.

Preferably, a stop is provided on the working surface along which the joining device can be moved, so that the slider is arranged between the stop and the working surface. The stop can thus still extend across an entire width of the working surface, i.e., from the first edge to the second edge. In this way, attachment of the stop relative to the working surface is facilitated, while a sufficiently long guidance of the joining device during the movement thereof over the working surface is allowed.

Preferably, a holding-down arm is provided in the region of the slider, which can be moved between a covering position, in which it covers coils positioned on the working surface, and a release position, in which access by the joining device to coils positioned on the working surface is possible. The holding-down arm bears against the coils when the coils are displaced transverse to the direction of movement of the joining device by the slider. In this way, the holding-down aim ensures that the coils do not shift upwards, i.e., away from the working surface, during this displacement movement. Once the displacement of the end of the coils is complete, i.e., when the space necessary for the joining device has been created, the holding-down arm can be moved away so that the joining device can begin its work. Thus, the holding-down arm does not interfere with the functioning of the joining device.

Preferably, a covering device is arranged at a distance from the working surface in a region of the first edge. This distance is essentially equal to the height of the coils, so that the coils can be displaced on the working surface but cannot deviate vertically from the working surface. The covering device can be embodied or formed as, e.g., a cover plate. It thus has a relatively low thickness. In this manner, the joining device can also be moved close enough to the coils in the region of the covering device to deposit a new coil on the working surface and bring the new coil into engagement with a coil already positioned on the working surface.

It is also advantageous if a releasable coil securing arm is provided in the region of the first edge. This coil securing arm acts on the coils that are already positioned on the working surface and connected to one another and prevents them from moving away from the working surface. The coil securing arm is released when the coils are displaced transverse to the direction of movement of the joining device by the slider. In this regard, it is preferred in embodiments to merely to reduce the force with which the coil securing arm acts on the coils, i.e., the screen which has already been formed. Thus, it is not necessary to move the coil securing arm away from the coils. The coil securing arm can still restrict a space of movement of the coils for a movement away from the working surface. Once the displacement of the end of the coils has occurred, the coil securing arm can act on the coils with a sufficient clamping force and hold them in place on the working surface. This is particularly advantageous for the insertion of a fixing wire, since the coils have a defined position on the working surface as a result of being clamped in place.

Preferably, a fixing wire insertion device, which is synchronized with the joining device, is provided. The fixing wire insertion device can insert a fixing wire in the overlap region between adjacent coils. Here, the synchronization between the fixing wire insertion device and the joining device is embodied or formed so that the tip of the fixing wire follows the movement of the joining device at a predetermined distance. Thus, there are only relatively short sections of coils adjacent to and engaged with one another that are not yet connected to one another by the fixing wire.

Embodiment are directed to a method of the type discussed above, in which the coils are, at least at their end adjacent to the first edge, displaced transverse to their longitudinal direction before the joining device begins depositing a new coil.

As explained above in connection with the apparatus, a clear space is created by this displacement, into which space the joining device can insert the beginning of a new coil, i.e., the end adjacent to the first edge. At the start of the depositing operation, the work of the joining device may therefore be limited solely to the depositing without the joining device already having to perform a transverse displacement of the coil at this moment. The risk that coils already positioned on the working surface are damaged during the depositing of the new coil, e.g., due to a deformation or a crushing, is therefore kept small.

Preferably, the end of the coils is covered during the displacement. In this manner, it is prevented that the coils lift off of the working surface or otherwise move in an undesired manner during the displacement. This covering merely involves a restriction of the movement possibilities of the coils in a direction extending away from the working surface vertically. However, a movement of the coils parallel to the working surface, i.e., horizontally, is permitted.

Preferably, the coils are secured against a movement in the region of the first end after the displacement. Once the coils have been displaced in the region of the end and a sufficient space for the depositing of a new coil is available, the securing of the coils already positioned on the working surface is advantageous, since these coils are then held in a predetermined position so that a fixing wire can be inserted. The securing, in embodiments, can be limited to the end of the coils, as a result of which the coils can be laterally displaced by the joining device in the region of their remaining length in order to create space for the new coils to be deposited.

Preferably, the coils are displaced at their end by a distance which is equal to a width of a displacement spur of the joining device. The displacement spur can be then be inserted into the cleared space without disadvantageously affecting the coils already positioned on the working surface. In a further movement of the joining device over the working surface, the displacement spur can then displace the coils positioned on the working surface in order to create space for the new coils to be deposited. The displacement spur has a width that is slightly smaller than the width of the coils that are to be deposited. This width is the extension of the coils parallel to the working surface. This then results in the newly deposited coil engaging in an overlapping manner with the coils already positioned on the working surface. A fixing wire can then be inserted into the overlapping region.

Advantageously, coils deposited on the working surface are secured against a movement away from the working surface. This involves not only the end of the coils that are adjacent to the first edge, but also the remaining length of the coils. Here, it is not necessary to apply a greater force to the coils. It is sufficient if a movement of the coils away from the working surface is restricted.

It is also advantageous if a fixing wire is inserted into an overlap region of adjacent coils. The fixing wire includes a tip that follows the joining device. The fixing wire can be inserted once two adjacent coils have been brought into engagement with one another. Thus, the distance between the tip of the fixing wire and the joining device can be kept relatively small, so that there are also only short sections in which adjacent coils are engaged with one another but are not yet connected to one another. This is a further measure for reducing a movement of coils away from the working surface.

Embodiments are directed to an apparatus for manufacturing coil screens that includes a working surface having a first edge and a second edge; a joining device, which is structured and arranged to deposit coils on the working surface, being movable over the working surface in a direction of movement from the first edge to the second edge; and a slider, which is arranged on the working surface at least in a region of the first edge, being movable perpendicularly to the direction of movement of the joining device.

According to embodiments, the joining device can include a displacement spur and the slider has a movement stroke that is at least equal to a width of the displacement spur.

In accordance with embodiments, the apparatus may further include a stop that is positionable on the working surface and along which the joining device is movable. The slider can be arranged between the stop and the working surface.

In embodiments, the apparatus may further include a holding-down arm, which is positionable in a region of the slider, that is structured and arranged to be movable between a covering position, in which the coils positioned on the working surface are covered, and a release position, in which the coils positioned on the working surface are accessible by the joining device.

According to other embodiments, the apparatus can also include a covering device arranged at a distance from the working surface in a region of the first edge.

In accordance with still other embodiments of the invention, the apparatus can also include a releasable coil securing arm positionable in a region of the first edge.

According to further embodiments, the apparatus can include a clamping-down device, which is positionable at a predetermined distance to the first edge, that is structured and arranged to restrict a space of movement of the deposited coils in a direction away from the working surface.

In still further embodiments, the apparatus may also include a fixing wire insertion device structured and arranged to be synchronized with the joining device.

Embodiments are directed to a method for manufacturing coil screens that includes consecutively depositing multiple coils side by side on a working surface via a joining device movable over the working surface in a direction of movement from a first edge of the working surface to a second edge of the working surface, whereby the multiple coils are brought into engagement with one another; and before the joining device begins depositing a new coil, displacing the coils, at least at their ends adjacent to the first edge, transversely to their longitudinal direction.

According to embodiments, the ends of the coils adjacent the first edge can be covered during the displacing of the coils.

In accordance with other embodiments, after the displacing of the coils, the method can further include securing the coils against movement in a region of the ends adjacent the first edge.

In still other embodiments, the joining device can include a displacement spur and the ends of the coils adjacent the first edge may be displaced by a distance equal to a width of the displacement spur. The displacing of the coils can include activating a slider to push the coils a distance corresponding to a width of the displacement spur. Further, during the displacing of the coils, the method may further include placing a holding-down arm into a position to prevent the deposited coils from being dislodged from the working surface.

According to other embodiments, the method may include securing the coils deposited on the working surface against a movement away from the working surface.

In still other embodiments, the method may further include inserting a fixing wire into an overlap region of adjacent coils. The fixing wire may include a tip that follows the joining device.

According to still further embodiments, after joining device moves from the first edge to the second edge, the method may further include severing the coil and returning the joining device to the first edge to deposit the new coil.

Embodiments of the invention are directed to an apparatus for manufacturing coil screens that includes a working surface having a first edge and a second edge; a joining device structured and arranged to deposit coils on the working surface during movement over the working surface from the first edge to the second edge, the joining device including a displacement spur having a largest width of about one-half of a width of the deposited coils, a slider arranged on the working surface that is movable perpendicularly to the direction of movement of the joining device to move the deposited coils to form an overlap region in successively deposited coils on the working surface; and a fixing wire insertion device structured and arranged to insert a fixing wire through the overlap region to fix the successively deposited coils on the working surface.

In accordance with still yet other embodiments of the present invention, the apparatus can include a holding-down arm structured and arranged to, in an active position, cover the deposited coils to prevent them from moving away from the working surface while the slider is operating; and a coil securing arm structured and arranged to, in an active position, clamp the deposited coils on the working surface while the slider is not operating.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a schematic side view of an apparatus for manufacturing coil screens;

FIG. 2 shows a schematic illustration of a joining device in an enlarged side view;

FIG. 3 shows a top view of the joining device according to FIG. 2 from below;

FIG. 4 shows a top view of the apparatus for manufacturing coil screens from above; and FIG. 5 shows a front view of the apparatus for manufacturing coil screens.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An apparatus 1 for manufacturing coil screens comprises a working surface 2, which has a first edge 3 and a second edge 4. A stop 5 is arranged on the working surface to extend from first edge 3 to second edge 4.

Above working surface 2, a winding device 6, which can be referred to as a "coil dispenser," is arranged. Winding device 6 produces a coil 7 from a wire, e.g., a plastic filament, which is removed from a supply, e.g., a supply roll, which is not illustrated in greater detail.

During the production of coil 7, winding device 6 can move over working surface 2, i.e., in a direction from first edge 3 to second edge 4.

Winding device 6 supplies coil 7 to a joining device 8, which is likewise moved over the working surface 2 during production of the coil screen, i.e., also in a direction from first edge 3 to second edge 4.

In the exemplary embodiment, joining device 8 can be moved adjacent to or along stop 5.

Joining device 8 comprises a channel 9, through which coil 7 can be guided. Joining device 8 comprises on its underside a displacement spur 10, which has a wedge shape in the direction of movement of joining device 8. Displacement spur 10 has its largest width at a back end, i.e., at an end of joining device 8 that faces first edge 3. The largest width of displacement spur 10 is smaller than a width of the produced coil 7, i.e., the extension of the coils parallel to working surface 2 and perpendicular to stop 5.

If joining device 8 with displacement spur 10 is moved from first edge 3 to second edge 4 between stop 5 and a coil 11 already positioned on working surface 2, then displacement spur 10 displaces already positioned coil (or coils) 11 on working surface 2 away from stop 5 to thereby create a clear space into which a newly created coil 7 can be inserted from winding device 6.

Displacement spur 10 thereby has a largest width transverse to the direction of movement from first edge 3 to second edge 4 that is slightly smaller than the width of coil 7, and preferably smaller than half of the width of coil 7. In this manner, new coil 7 is brought into engagement with coils 11 already positioned on working surface 2. Thus, there results an overlap region, into which a fixing wire 12 can be inserted (also see FIG. 5) in order to connect overlapping coils 7, 11 to one another.

Once joining device 8 has been moved across the width of working surface 2 from first edge 3 to second edge 4, which movement can occur synchronously with a corresponding movement of winding device 6, coil 7 that is then deposited on working surface 2 is severed. Joining device 8, together with winding device 6, is once again moved back to first edge 3. Of course, in embodiments, more than one joining device 8 can be associated with winding device 6 in the apparatus and/or more than one winding device 6 can be present in the apparatus, so that during a return movement of a joining device 8 and a winding device 6, another joining device 8 can already be depositing a new coil 7 from another winding device 6 on working surface 2.

The above-described approach described known from DE 10 2007 052 594 B4 and its family member U.S. Patent Publication No. 2010/0287775. Other details can be obtained by referring to these documents, which are expressly incorporated by reference herein in their entireties.

To facilitate the start of a depositing operation, a slider 13, which can be actuated by a drive 14, is provided in a region of first edge 3 of working surface 2. Slider 13 has a movement stroke which is roughly a same size as a largest width of displacement spur 10 transverse to the direction of movement of joining device 8. However, this movement stroke is not significantly larger than a largest width of displacement spur 10.

As is only illustrated in FIG. 5, a holding-down arm 15, provided in a region of slider 13, can be pivoted from a covering position illustrated with solid lines in FIG. 5 to a release position illustrated with dashed lines. For this purpose, a pivot drive 16 is provided. In the covering position, holding-down arm 15 is arranged above coil 11 already deposited on working surface 2, but does not act on coil 11 or at least does not do so with any significant force. Holding-down arm 15 merely prevents coil 11 from vertically moving away from working surface 2 when slider 13 is actuated. Slider 13 has a thickness, i.e., an extension in a direction away from (or normal to) working surface 2, that is at least as large as half of the height of coils 11. Thus, slider 13 can push coils 11 at their center of mass so that a risk of coils 11 being dislodged from working surface 2 can be also kept small by this measure.

Holding-down arm 15 reaches into a space provided between stop 5 and a covering device 17. Covering device 17 is, e.g., embodied or formed as a thin plate with a thickness of 0.1 to 1 mm, and preferably 0.1 to 0.3 mm. Covering device 17 also has a function of preventing a movement of coils 11 away from working surface 2. Covering device 17 applies a clamping force to coil 11.

On a side of covering device 17 facing away from stop 5, a clamping-down device or coil securing aim 18 is arranged, to which a force 19 can be applied by an actuator in order to clamp coils 11 deposited on working surface 2 in place on working surface 2.

As can be seen in FIG. 4, additional clamping-down device elements (or coil securing arm elements) 20, which can be distributed across the width of the working surface 2, are provided. Clamping-down device elements 20 are held in a pivotable manner on an axle 21 and only bear against coil 11 deposited on the working surface 2 with their weight. Thus, they allow a movement of deposited coils 11, but prevent a dislodging of coils 11 from working surface 2.

To manufacture a coil screen, a coil 7 is first deposited on working surface 2. In the exemplary embodiment, as joining device 8 moves along stop 5 and over working surface 2 from first edge 3 to second edge 4, a deposited coil 11 is thus created. Following a severing of the newly deposited coil 11, joining device 8 once again returns to its initial position at first edge 3.

Before joining device 8 begins to deposit another or a next coil 7, slider 13 is activated and slides an end of deposited coil 11 adjacent to first edge 3 by a distance transverse to the direction of movement of joining device 8 that corresponds to the width of displacement spur 10. During this displacement, holding-down min 15 is locked in the position illustrated by solid lines in FIG. 5, i.e., to prevent a dislodging of deposited coils 11 from working surface 2.

When slider 13 is actuated, coil securing arm 18 is deactivated, i.e., it bears against the deposited coils 11 only by its own weight, i.e., without applying a clamping force onto deposited coils 11. Thus, a movement of coils 11 by slider 13 is possible. However, a deviation of coils 11, i.e., movement away from working surface 2, is not possible.

Once the movement of slider 13 is complete, coil securing arm 18 is once again activated, i.e., a force 19 is produced onto coils 11, so that the deposited coils 11 are clamped in place on working surface 2 so that deposited coils 11 assume a defined position.

The holding-down arm 15 is then pivoted into the release position illustrated with dashed lines in FIG. 5, so that joining device 8 can move into the position of holding-down arm 15. Displacement spur 10 of joining device 8 then enters into a space which has been cleared next to stop 5 as a result of the work by slider 13. Once displacement spur 10 has entered into this space, it can displace deposited coils 11 via the wedge shape as it is moved from first edge 3 to second edge 4 of working surface 2.

Because slider 13, as is visible in FIG. 5, is arranged between working surface 2 and stop 5, the function of stop 5 can still be performed, i.e., stop 5 can serve as a contact surface for joining device 8.

Fixing wire 12 is supplied by a fixing wire insertion device 22, which draws fixing wire 12 off a supply spool 23. Fixing wire insertion device 22 is activated once joining device 8 has begun depositing coil 7 onto working surface 2 and bringing deposited coil 7 into engagement with coils 11 that are already positioned on working surface 2. Fixing wire 12 has a tip 24 which follows joining device 8 at a short distance. Within this distance there no connection between newly supplied coil 7 and already deposited coils 11. For this purpose, it is merely necessary to synchronize fixing wire insertion device 22 and the drive of joining device 8 and, if necessary, the drive of winding device 6 with one another.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An apparatus for manufacturing coil screens comprising:
   a working surface having a first edge and a second edge;
   a joining device, which is structured and arranged to deposit coils on the working surface, being movable over the working surface in a direction of movement from the first edge to the second edge;

a slider, which is arranged on the working surface at least in a region of the first edge, being movable perpendicularly to the direction of movement of the joining device; and a stop that is positionable on the working surface and along which the joining device is movable, wherein the slider is arranged between the stop and the working surface.

2. The apparatus according to claim 1, wherein the joining device comprises a displacement spur and the slider has a movement stroke that is at least equal to a width of the displacement spur.

3. The apparatus according to claim 1, further comprising a covering device arranged at a distance from the working surface in a region of the first edge.

4. The apparatus according to claim 1, further comprising a releasable coil securing arm positionable in a region of the first edge.

5. The apparatus according to claim 1, further comprising a clamping-down device, which is positionable at a predetermined distance to the first edge, that is structured and arranged to restrict a space of movement of the deposited coils in a direction away from the working surface.

6. The apparatus according claim 1, further comprising a fixing wire insertion device structured and arranged to be synchronized with the joining device.

7. An apparatus for manufacturing coil screens comprising:
a working surface having a first edge and a second edge;
a joining device, which is structured and arranged to deposit coils on the working surface, being movable over the working surface in a direction of movement from the first edge to the second edge;
a slider, which is arranged on the working surface at least in a region of the first edge, being movable perpendicularly to the direction of movement of the joining device; and
a holding-down arm, which is positionable in a region of the slider, that is structured and arranged to be movable between a covering position, in which the coils positioned on the working surface are covered, and a release position, in which the coils positioned on the working surface are accessible by the joining device.

8. A method for manufacturing coil screens comprising:
consecutively depositing multiple coils side by side on a working surface via a joining device movable over the working surface in a direction of movement from a first edge of the working surface to a second edge of the working surface, whereby the multiple coils are brought into engagement with one another; and
before the joining device begins depositing a new coil, displacing the coils, at least at their ends adjacent to the first edge, transversely to their longitudinal direction,
wherein the displacing of the coils comprises activating a slider to push the coils a distance corresponding to a width of the displacement spur, and wherein, during the displacing of the coils, the method further comprises placing a holding-down arm into a position to prevent the deposited coils from being dislodged from the working surface.

9. The method according to claim 8, wherein the ends of the coils adjacent the first edge are covered during the displacing of the coils.

10. The method according to claim 8, wherein, after the displacing of the coils, the method further comprises securing the coils against movement in a region of the ends adjacent the first edge.

11. The method according to claim 8, wherein the joining device comprises a displacement spur, and wherein the ends of the coils adjacent the first edge are displaced by a distance equal to a width of the displacement spur.

12. The method according to claim 8, further comprising securing the coils deposited on the working surface against a movement away from the working surface.

13. The method according to claim 8, further comprising inserting a fixing wire into an overlap region of adjacent coils.

14. The method according to claim 13, wherein the fixing wire comprises a tip that follows the joining device.

15. The method according to claim 8, wherein, after joining device moves from the first edge to the second edge, the method further comprises severing the coil and returning the joining device to the first edge to deposit the new coil.

16. An apparatus for manufacturing coil screens comprising:
a working surface having a first edge and a second edge;
a joining device structured and arranged to deposit coils on the working surface during movement over the working surface from the first edge to the second edge, the joining device including a displacement spur having a largest width of about one-half of a width of the deposited coils;
a slider arranged on the working surface that is movable perpendicularly to the direction of movement of the joining device to move the deposited coils to form an overlap region in successively deposited coils on the working surface;
a fixing wire insertion device structured and arranged to insert a fixing wire through the overlap region to fix the successively deposited coils on the working surface;
a holding-down arm structured and arranged to, in an active position, cover the deposited coils to prevent them from moving away from the working surface while the slider is operating; and
a coil securing arm structured and arranged to, in an active position, clamp the deposited coils on the working surface while the slider is not operating.

* * * * *